United States Patent Office 3,006,853

Patented Oct. 31, 1961

3,006,853

SQUARE LOOP CADMIUM-NICKEL FERRITES

Barlane R. Eichbaum, Poughkeepsie, N.Y., assignor to International Business Machines Corporation, New York, N.Y., a corporation of New York No Drawing. Filed Dec. 19, 1957, Ser. No. 703,731
4 Claims. (Cl. 252—62.5)

This invention relates to ferromagnetic materials of the rectangular or square hysteresis loop type which have been found to be especially desirable for use in computer mechanisms. More particularly, it relates to a ferrospinel system comprising cadmium-nickel ferrite, characterized by having a low resistivity and low dielectric constant.

Since the discovery that the magnetic characteristics of ferrospinels could be changed by changing its chemical constitution, it has been desired to prepare new ferrospinel systems which would retain the basic attributes of these materials and at the same time possess some magnetic properties which would enable its use in selective applications in computer type devices.

Thus, in the copending application Serial No. 686,215, filed September 15, 1957, and assigned to the same assignee as this application, the ferrite system CdO—MnO—$Fe_2O_3$ was described as having very fast switching times. The magnetic characteristics of that system made it especially desirable in a coincident flux operating type memory system.

Likewise, the copending application Serial No. 706,175, filed December 30, 1957, now abandoned, and assigned to the same assignee as this invention, was based upon the discovery that the ferrite system MgO—MnO—ZnO—$Fe_2O_3$, in which zinc oxide was present in high concentration, exhibited a number of magnetic characteristics for memory systems previously unobtainable in other ferrite systems. In particular, this system exhibited a very low coercive force, which enables its adaption for memory systems driven by transistor components.

Certain techniques have been investigated for sensing the magnetic state of various magnetic materials. In order for this technique to be effective with ferrite materials, it is necessary for the ferrite to have a low resistivity and a low dielectric constant. This technique makes it possible to sense the magnetic state of the core during the switching process by means of conductive electrodes placed on the surface of the core at appropriate locations. The change in magnetic state may be detected by measuring the resulting potential difference between surfaces of the structure which have been coated with a conductive media such as silver metal.

An object of this invention is to provide a ferrite which possesses a set of useful magnetic characteristics hitherto unavailable with other ferrite materials.

A more specific object of this invention is to prepare a ferrospinel having a low resistivity.

Still another object is to synthesize a ferrite having a low dielectric constant.

Among the other objects of this invention is to provide a novel mixed ferrospinel having a rectangular hysteresis characteristic.

Still another object of this invention is to make a ferrite, which, in addition to the above properties, has a high coercive force and a relatively fast switching parameter.

Other objectives will be pointed out in the following description and claims which disclose, by way of example, the principle of the invention and the best manner which has been contemplated of applying that prinicple.

Applicant has discovered that the cadmium-nickel ferrite system, within the composition range of about 5–35 mol percent CdO, 10–35 mol percent NiO and 50–68 mol percent $Fe_2O_3$, exhibits the required magnetic properties described above.

The ferrites of the present invention were prepared by standard sintering procedures as described in detail in Serial No. 431,613, filed May 21, 1954, now abandoned, and assigned to the same assignee as this application. Accordingly, the ferrite constituents are sintered at 1000–1500° C. for about 15 minutes to 3 hours and suitably at 1200° C. for one hour. During the firing step the cores were contained in an uncovered platinum boat except for CN–4B where a covered receptacle was used according to the technique given in Serial No. 690,303, filed October 15, 1957, and assigned to the same assignee as this application. For example one cadmium nickel ferrite composition is formed by heating a mixture of 5 mol percent CdO, 35 mol percent NiO and 60 mol percent $Fe_2O_3$ in an uncovered platinum boat at 1200° C. for one hour. Where some volatilization of cadmium oxide was permitted to occur, the resulting sintered core possessed a concentration gradient with respect to cadmium oxide. Such a gradient has a favorable effect in lowering the magnitude of the resistivity and the dielectric constant.

Table I shows the resistivity and dielectric constant data obtained on a typical composition of the present ferrite system prepared by the method described above. The data may be compared with that for square loop manganese-magnesium ferrospinel, which is typical of known ferrites and which is also shown therein. The resistivities were calculated from voltage-current plots after subjecting the discs to 100 volts for a period of time necessary to insure stability in the readings, usually about thirty minutes. The dielectric constants were calculated from capacitance and density measurements at the frequencies indicated.

*Table I*

| | Resistivity (ohm-cm.) | Dielectric constant | |
|---|---|---|---|
| | | $10^4$ cycles/sec. | $10^6$ cycles/sec. |
| CN–4 [a] | $4\times10^5$ | 20 | 15 |
| CN–4B [b] | $1\times10^6$ | 250 | 150 |
| 301 [c] | $10^8$–$10^9$ | 25 | 15 |

[a] 12 mol percent CdO-33 mol percent, NiO-55 mol percent, $Fe_2O_3$; heated in an uncovered boat.
[b] Presintered cores were contained in a covered platinum receptacle during firing.
[c] 37.5 mol percent MgO—22.5 mol percent MnO—40 mol percent $Fe_2O_3$.

The data indicates that the resistivity of this ferrite system is in the order of magnitude desired for conductive switching. The low value of dielectric constant of CN–4 is advantageous in preventing capacitance pickup during operation of material in the non-mechanical memory system.

Table II shows some magnetic characteristics of CN–4 indicating its suitability as a memory element.

*Table II*

| | |
|---|---|
| $B_r/B_s$ (remanence to saturation ratio) | 0.95. |
| $H_c$ (coercive force) | 2.5 oersteds. |
| $T_s$ (switching time) | 600 mμsec. (at 1 amp. drive current and 100 mμsec. rise time). |
| $S_w$ (switching constant) | 1.5 oersteds-microseconds. |
| $T_c$ (Curie temperature) | 400° C. |

The range of compositions presented in Table III includes square hysteresis loop ferrites which have low resistivities. As the cadmium oxide content is increased in this system, it is found that the resistivity values decrease, but that the squareness ratio also decreases. For applications involving conductive switching, where a maximum squareness ratio is not essential, a high cadmium oxide content is preferable.

Constituent proportions of a number of other cadmium-nickel ferrite compositions that have been prepared, and for which remanence to saturation ratios $B_r/B_s$ have been determined, are indicated in the following table.

*Table III*

| Code No. | Composition (mol percent) | | | $B_r/B_s$ |
|---|---|---|---|---|
| | CdO | NiO | $Fe_2O_3$ | |
| CN-1 | 25 | 25 | 50 | 0.73 |
| CN-2 | 35 | 15 | 50 | 0.70 |
| CN-3 | 22 | 10 | 68 | 0.75 |
| CN-5 | 5 | 35 | 60 | 0.95 |
| CN-6 | 15 | 35 | 50 | 0.93 |
| CN-7 | 15 | 25 | 60 | 0.85 |

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A product formed by heating a mixture of 5–35 mol percent CdO, 10–35 mol percent of NiO and 50–68 mol percent $Fe_2O_3$ at about 1000–1500° C. in an uncovered boat for about 15 minutes to 3 hours.

2. A product formed by heating a mixture of 22 mol percent CdO, 10 mol percent NiO, and 68 mol percent $Fe_2O_3$ at about 1000–1500° C. in an uncovered boat for about 15 minutes to 3 hours.

3. The product formed by heating a mixture of 5 mol percent CdO, 35 mol percent NiO and 60 mol percent $Fe_2O_3$ in an uncovered boat at 1200° C. for one hour.

4. The product formed by heating a mixture of 12 mol percent CdO, 33 mol percent NiO and 55 mol percent $Fe_2O_3$ in an uncovered platinum boat at 1200° C. for one hour, said product having a resistivity of $4 \times 10^5$ ohm centimeters and a dielectric constant of 20 at $10^4$ cycles per second.

References Cited in the file of this patent

UNITED STATES PATENTS

| | | |
|---|---|---|
| 2,549,089 | Hegyi | Apr. 17, 1951 |
| 2,565,861 | Leverenz et al. | Aug. 28, 1951 |
| 2,579,978 | Snoek et al. | Dec. 25, 1951 |

FOREIGN PATENTS

| | | |
|---|---|---|
| 713,370 | Great Britain | Aug. 11, 1954 |
| 735,375 | Great Britain | Aug. 17, 1955 |

OTHER REFERENCES

J. Inst. of Elec. Engs., Japan, November 1937, page 5.

Comptes Rendus, Forester et al., July 1939, pp. 164–166.

RCA Review, Harvey et al., September 1950, pp. 345, 346 and 349–361.

Philips: Tech. Review, Wijn et al., August 1954, p. 54.

J. Amer. Ceramic Ind., Economos, July 1955, p. 242.